(12) United States Patent
Ramsay

(10) Patent No.: US 6,280,630 B1
(45) Date of Patent: Aug. 28, 2001

(54) PROCESS FOR THE TREATMENT OF EFFLUENT STREAMS

(75) Inventor: James Ian Ramsay, Stevenston (GB)

(73) Assignee: Mintek, Randburg (ZA)

( * ) Notice: Subject to any disclaimer, the term of this patent is extended or adjusted under 35 U.S.C. 154(b) by 0 days.

(21) Appl. No.: 09/424,724
(22) PCT Filed: Jun. 3, 1998
(86) PCT No.: PCT/GB98/01610
  § 371 Date: Mar. 8, 2000
  § 102(e) Date: Mar. 8, 2000
(87) PCT Pub. No.: WO98/55405
  PCT Pub. Date: Dec. 10, 1998

(30) Foreign Application Priority Data
Jun. 3, 1997 (GB) ................................................ 9711451

(51) Int. Cl.⁷ .......................................................... C02F 1/62
(52) U.S. Cl. .......................... 210/711; 210/713; 210/724; 210/726; 210/912; 423/122; 423/128; 423/129; 423/158; 423/165; 423/166
(58) Field of Search .................................. 210/711, 712, 210/713, 724, 725, 726, 727, 768, 769, 912; 423/122, 128, 129, 158, 165, 166

(56) References Cited

U.S. PATENT DOCUMENTS

| | | | |
|---|---|---|---|
| 3,959,133 | * 5/1976 | Fulton | 423/132 |
| 4,539,119 | * 9/1985 | Cann | 210/711 |
| 5,202,062 | * 4/1993 | Baba et al. | 252/633 |
| 5,275,691 | * 1/1994 | Fukuta et al. | 156/642 |
| 5,547,588 | * 8/1996 | Hassett et al. | 210/724 |
| 5,695,646 | * 12/1997 | Graf | 210/716 |

FOREIGN PATENT DOCUMENTS 0250626  1/1988 (EP).
0584502  3/1994 (EP).

OTHER PUBLICATIONS

English Translation Of Claims of EP 0584502 Dated Mar. 2, 1994.
English Translation Of EP 0250626 Dated Jan. 7, 1988.
Taylor, R.M. et al. "Remediation of AMD: The Green Precipitate Process." EPD Congress, (1998) pp. 367–379.
Brown, P W et al. "Kinetics of the Early Hydration of Tricalcium Aluminate in Solutions . . . " Journal of the American Ceramic Society, vol. 67, (Dec. 1984) pp. 793–795.
Poellmann, H et al. "Solid Solution of Ettringites." Cement and Concrete Research, vol. 23, (1993) pp. 422–430.
Eitel Wilhelm: Recent Investigations of the System Lime–Alumina–Calcium Sulfate–Water . . . Journal of the American Concrete Institute, (Jan. 1957) pp. 679–698.
Albino, V et al. "Potential Application of Ettringite Generating Systems for Hazardous Waste Stabilization." Journal of Hazardous Materials 51 (1996); pp. 241–252.
Jones, F E: "Equilibria with Crystalline $Al_2O_3$ $3H_2O$, Alumina Gel, and Solid Solution." The Quaternary System $CaO–Al_2O_3–CaSO_4–H_2O$ at 25° C (1944) pp. 311–357.

(List continued on next page.)

Primary Examiner—Peter A. Hruskoci
(74) Attorney, Agent, or Firm—Ladas & Parry

(57) ABSTRACT

This invention relates to a process for removing sulphates and calcium from a water stream which includes the steps of: combining the water stream and an amount of amorphous aluminum trihydroxide ($Al(OH)_3$); allowing the formation of ettringite ($3CaO.Al_2O_3.3CaSO_4.31/32H_2O$) as a precipitate; and removing the precipitated ettringite from the water stream.

22 Claims, 2 Drawing Sheets

OTHER PUBLICATIONS

Woroszynska, A et al. "Removal of Sulphates from Tap Water by Precipitation or Crystallization of Ettringite." Environmental Science Research, vol. 51 (1996) pp. 193–201.

Pöllmann, H et al. "Compounds with Ettringite Structure" N. JB. Miner.Abh, 160 (1989) pp. 133–158.

Mohamed, A.M.O. et al. "Ettringite Formation in Lime–Remediated Mine Tailings: I. Thermodynamic Modeling."CIM Bulletin(Nov./Dec. 1995)vol. 88,No.995 pp. 69–75.

Bensted, J: A discussion of the paper"Solid Solution of Ettringites:Part 1:Incorporation of OH and $CO_3^{2-}$ in $3CaO.Al_2O_3.3CaSO_4.32H_2O$". Cement and Concrete Research.vol. 21,(1991)p679.

McCarthy, GJ:"Synthesis, Crystal Chemistry and Stability of Ettringite, A Material with Potential Applications in . . ." Mat. Res. Soc. Symp. Proc., vol. 245, (1992); pp. 129–140.

Heil, G et al. "Reduction of Sulphate Contents of Industrial Sewerage by Ettringite Precipitation." vol. 35, No. 9 (1991) pp. 1231–1237.

* cited by examiner

PROCESS FOR THE TREATMENT OF EFFLUENT STREAMS

BACKGROUND OF THE INVENTION

THIS invention relates to a process for the treatment of water streams.

Water streams, typically waste waters, and in particular acid mine drainage waters, can have pH values as low as 1.5 or 2. They also typically contain high levels of dissolved calcium, magnesium, heavy metals and sulphate. These water streams are traditionally neutralised with lime prior to discharge, and as a result they contain large quantities of calcium sulphate in solution. The discharge of these water streams into natural water courses presents a growing environmental problem.

The solubility of calcium sulphate dihydrate (gypsum) in water at 20° C. is 2.35 g/l, which means that one cubic meter of water saturated with calcium sulphate would contain 0.55 kg of calcium and 1.31 kg of sulphate. In other words, a saturated acidic mine water stream flowing at 500 m$^3$/h, would contaminate natural water courses with 2390 t calcium and 5746 t sulphate annually.

SUMMARY OF THE INVENTION

According to the invention a process for the removal of sulphates and calcium from a water stream comprises the steps of:

combining the water stream and an amount of amorphous aluminium trihydroxide (Al(OH)$_3$));

allowing the formation of ettringite (3CaO.Al$_2$O$_3$.3CaSO$_4$.31/32H$_2$O) as a precipitate; and recovering the precipitated ettringite from the water stream.

The water stream may be combined with both an amount of amorphous aluminium trihydroxide and an amount of lime (CaO) to raise the pH of the water stream, typically to 11.0.

The mass ratio of amorphous aluminium trihydroxide which is combined with the water stream is preferably such that the ratio of amorphous aluminium trihydroxide to sulphate present in the water stream is up to 1:1.

When the water stream contains calcium-associated sulphate and is saturated with respect to calcium sulphate and a high degree of calcium sulphate removal is required, this ratio may be from 0.1 to 1:1, such as from 0.5 to 0.8:1 or 0.65 to 1:1.

The ettringite may be removed from the water stream by settling and/or filtration. Amorphous aluminium trihydroxide may be recovered from the ettringite removed from the water stream by decomposing an ettringite suspension or slurry as described below. The recovered amorphous aluminium trihydroxide may be recycled to treat a water stream containing sulphates and calcium.

The water stream may be effluent mine water with a pH ranging from highly acidic to highly alkaline.

The pH may be in the range 2 to 8 or greater.

The process may include a first preliminary step of raising the pH of the water stream. The pH may be raised to a value of between 11.0 and 12.6 such as between 11.7 and 12.3 or between 11.7 and 12.0.

The pH of the water stream may be raised above 12.0 to remove sulphates associated with potassium and/or sodium.

The pH of the water stream may be raised by adding lime (CaO) and/or another alkali to it.

The first preliminary step may include the removal of impurities that are insoluble at the raised pH value as precipitates.

The precipitates may be hydroxides.

The impurities may comprise magnesium and/or heavy metals, such as iron, aluminium and manganese.

The process may include a second preliminary step of desupersaturating the water stream by reducing its calcium sulphate content to a saturation level.

The desupersaturating step may involve passing the water stream through a high solids precipitator to cause precipitation of calcium sulphate on gypsum seed in the form of calcium sulphate dihydrate (gypsum).

The gypsum seed may be freshly introduced or recycled from one of the solid/liquid separation steps of the process of the invention.

The process may include a post treatment step of adding carbon dioxide to the water stream to precipitate dissolved lime as calcium carbonate and to reduce the pH of the water stream to a value of between 7.0 and 10.0, preferably to between 7.5 and 9.0.

The precipitated calcium carbonate is preferably recovered by settling and/or filtration.

Alternatively, the post treatment step may involve the addition of sufficient carbon dioxide to from soluble calcium bicarbonate to produce a less corrosive, more stable waste water.

According to another aspect of the invention a process for separating amorphous aluminium trihydroxide from a suspension containing solid amorphous aluminium trihydroxide and solid or dissolved calcium sulphate comprises the steps of:

adding sulphate and/or calcium and a sufficient volume of water to the suspension to ensure that the calcium sulphate is substantially dissolved to form a supersaturated solution of calcium sulphate with amorphous aluminium trihydroxide in suspension; and recovering the suspended amorphous aluminium trihydroxide.

The suspension containing amorphous aluminium trihydroxide and calcium sulphate may be a decomposed ettringite slurry decomposed in a decomposition step.

The pH in the ettringite decomposition step may have been lowered to decompose the ettringite.

The pH in the ettringite decomposition step is preferably lowered to a pH in the range of 4.0 to 8.5.

The pH in the ettringite decomposition step may be lowered by adding an acid or by sparging with CO$_2$ or SO$_2$. Preferably, sulphuric acid is added to lower the pH and optionally to supersaturate the resulting calcium sulphate solution.

A sufficient volume of saturated calcium sulphate solution may be added to the decomposed ettringite to ensure that the calcium sulphate resulting from the breakdown of the ettringite is substantially dissolved to form the supersaturated solution of calcium sulphate, leaving the amorphous aluminium trihydroxide in suspension.

The process may also comprise the step of desupersaturating the supersaturated calcium sulphate solution by precipitating calcium sulphate on gypsum seed to form gypsum and a saturated calcium sulphate solution.

The saturated calcium sulphate solution may be recycled and added to the ettringite slurry decomposition step.

BRIEF DESCRIPTION OF THE DRAWINGS

The invention will now be described in more detail, by way of example only, with reference to the accompanying drawings.

DETAILED DESCRIPTION OF THE INVENTION

Figure 1:
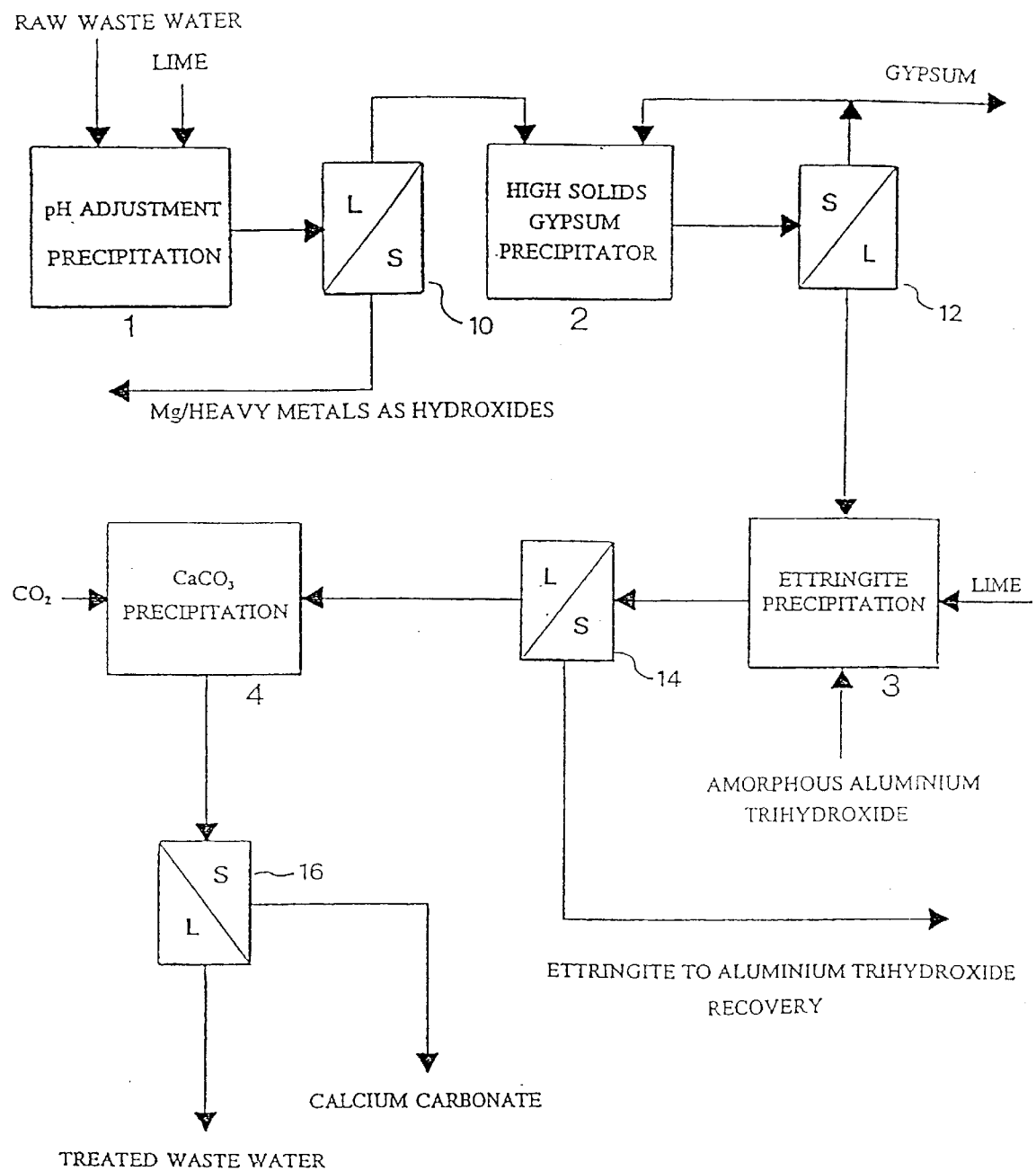
FIG. 1 is a schematic representation of a waste water treatment process of the invention.

The process of the invention, as set out schematically in FIG. 1, is a process for the removal of impurities, typically calcium and sulphate, from water streams, particularly industrial waste waters such as acid mine drainage waters.

The most important step of the process involves the addition of amorphous aluminium trihydroxide ($Al(OH)_3$) to a water stream, hereinafter referred to as the waste water. This results in the formation and precipitation of insoluble calcium sulphoaluminate (ettringite) ($3CaO.Al_2O_3.3CaSO_4.31/32H_2O$). (This significantly reduces the dissolved salt content of the waste water and particularly the amount of calcium and sulphate ions in solution.) An important advantage of this process is that the addition of amorphous aluminium trihydroxide to the water stream or waste water stream does not result in the addition of further ions to the final water or waste water stream to be discharged. The use of aluminium trihydroxide in amorphous and reactive form is also important in the process of the invention.

The process of the invention comprises a number of preliminary steps and post treatment steps.

In the case of acid waste water containing sulphates, in (preliminary) step 1 the pH of the acid waste water is raised by adding lime (CaO) or another alkali, such as caustic soda, to it. This raises the pH of the waste water to a value of between 11.0 and 12.6. At this pH, iron, aluminium, manganese, magnesium and other heavy metal impurities precipitate out of solution as hydroxides. The precipitates are solid precipitates which are separated out from the waste water by using a solids/liquid separator 10. The calcium content of the water, with the addition of the lime, increases. In some instances, if the waste water already contains a high concentration of calcium, a highly supersaturated calcium sulphate solution is generated. This supersaturated waste water then passes on to the next step of the process, (preliminary) step 2.

If the waste water has already been pre-limed, but not to the high pH required in step 1 of the present process, then step 1 is performed. However, if the waste water has been pre-limed to the required pH and the precipitated solids removed, step 1 can be omitted from the overall treatment process of the invention.

Step 2 is only performed if the waste water is a calcium sulphate supersaturated solution. In this step the waste water is desupersaturated by using freshly introduced or recycled gypsum seed and removing some of the calcium sulphate in the form of calcium sulphate dihydrate (gypsum) in a high solids precipitator 12. This process takes approximately 15 minutes and brings the calcium sulphate content of the waste water down to saturation level. If the waste water is not supersaturated, this step is bypassed. The removal of impurities as hydroxides and the recovery of gypsum from a calcium sulphate supersaturated solution could be performed without the intermediate solid/liquid separation of preliminary step 1. The waste water, saturated with calcium sulphate, is then transferred to the next step of the process, step 3.

In step 3, the crucial step of the process is performed. Amorphous aluminium trihydroxide and lime (if necessary) are added to the waste water. The amount of amorphous aluminium trihydroxide that is added depends on the required degree of calcium sulphate removal from the waste water stream. The dosage of amorphous aluminium trihydroxide to calcium-associated sulphate present is up to 1:1, typically in the ratio of 0.1, to 1:1. When the calcium sulphate level of the waste water is close to saturation and total removal is required, the dosage of amorphous aluminium trihydroxide may be from 0.5 to 0.8:1 or 0.65 to 1:1. If, however, the level of calcium sulphate removal required is lower, then a lower dosage of amorphous aluminium trihydroxide is required. (Theoretically, in the ettringite structure, the ratio of $Al(OH)_3$ to $SO_4$ is 0.54:1. However, in practice a greater amount of amorphous aluminium trihydroxide is added to ensure maximum precipitation.) The lime is added to ensure a stable, high pH of the waste water, which allows the formation of ettringite to proceed.

Amorphous aluminium trihydroxide may be produced as a gel from a sodium aluminate solution, either by gassing the solution with carbon dioxide or by neutralising it with acid. It may also be produced by precipitation from an acidic aluminium salt (typically aluminium sulphate, chloride or nitrate). The preparation step which involves gassing with carbon dioxide is preferred.

The reaction which occurs in step 3 in the waste water between the lime, aluminium trihydroxide and soluble calcium sulphate present must be carried out in the alkaline pH range, at a pH of between 11.0 and 12.6 for example 12.5, such as between 11.7 and 12.3 for example 11.8, and preferably at a pH of between 11.5 and 12.5. As indicated above, this high pH may be achieved by adding lime. The pH may be raised about 12.0 to remove sulphates associated with potassium and/or sodium and this may require additional amorphous aluminium trihydroxide.

The reaction, the chemical details of which are set out below, is usually complete within 15 minutes and the mineral ettringite, which is insoluble calcium sulphoaluminate, is formed.

$$3CaO+2Al(OH)_3+3CaSO_4+28H_2O \rightarrow 3CaO.Al_2O_3.3CaSO_4.31/32H_2O$$

| Lime | Aluminium Trihydroxide | Soluble Calcium Sulphate | Water | Calcium Sulphoaluminate (ettringite) (Insoluble) |
|---|---|---|---|---|

The insoluble ettringite which is formed settles fairly rapidly and/or is easily filtered out in a solids/liquid separator 14. The aluminium trihydroxide can be recovered from the precipitated ettringite in an associated process and recycled as described below. This ensures that the process of the invention is highly cost effective when compared to alternatives such as ion exchange and membrane separation techniques.

The waste water which has now had the ettringite removed from it still has a high pH and it is then transferred to the next step of the process, (post treatment) step 4.

In step 4 carbon dioxide is added to the high pH waste water by gassing. The carbon dioxide reacts with any calcium ions still present in the waste water (some from the dissolved lime) to form calcium carbonate which is also insoluble and which can be separated from the waste water in a solids/liquid separator 16. The addition of carbon dioxide also reduces the final pH of the waste water to a more neutral pH of between 7 and 10 and preferably to a pH of between 7.5 and 9. The treated waste water, at the more neutral pH and with the majority of the dissolved impurities now removed, can then be discharged. An alternative is to add a sufficient amount of carbon dioxide to form soluble calcium bicarbonate. This results in a treated waste stream with a higher residual alkalinity which is a less corrosive, more stable waste water. Should a use exist for the high pH water leaving step 3, then step 4 can be omitted.

The process of the invention is highly effective in treating sulphate-containing waste waters, particularly calcium sulphate-containing waste waters. However, it does not remove sulphate combined with either sodium or potassium, unless the formation of ettringite is carried out at a pH exceeding 12.0. At a pH of above 12.0 the following reaction could take place:

$$3Na_2SO_4 + 6Ca(OH_2) + 2Al(OH_3) + 25H_2O \rightarrow 3CaO.Al_2O_3.3CaSO_4.31H_2O + 6\ NaOH.$$

Also, waters with a high chloride content may require further treatment following the calcium sulphate removal process, depending on the discharge specification requirements.

Figure 2:
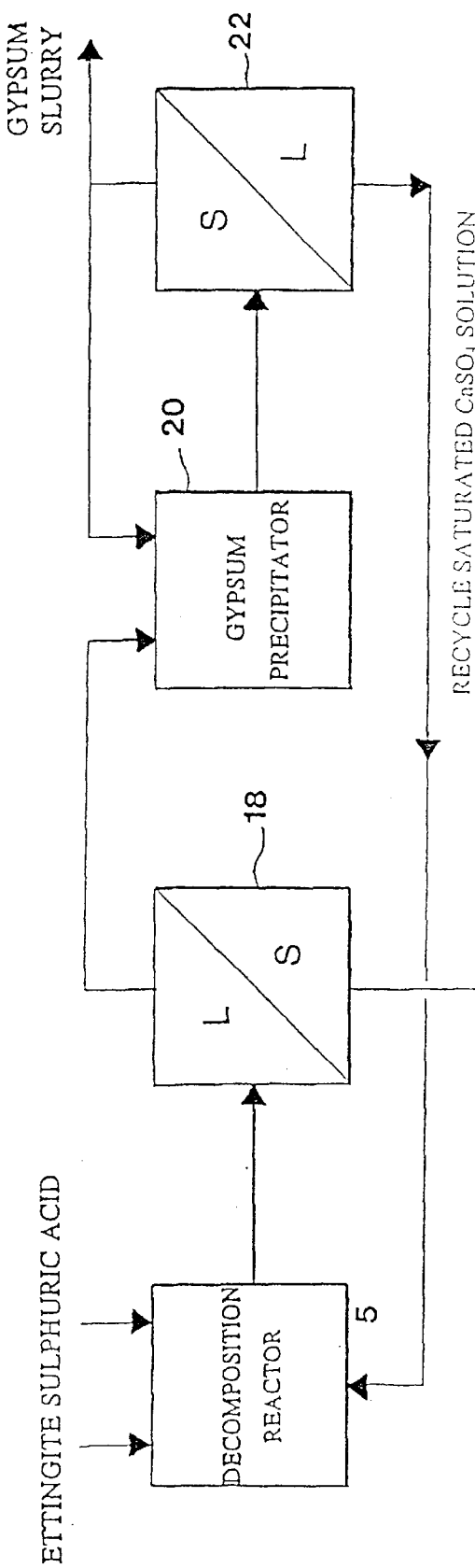
FIG. 2 is a schematic representation of a process for the recovery of amorphous aluminium trihydroxide from ettringite.

The removal/recovery of amorphous aluminium trihydroxide from ettringite is set out schematically in FIG. 2. In the recovery stage, the amorphous aluminium trihydroxide is recovered from the ettringite and recycled. This substantially improves the economics of the process.

An important feature of this invention is the recovery of amorphous aluminium trihydroxide from the ettringite slurry formed in step 3 and which is recovered in the solids/liquids separator 14.

The ettringite slurry is decomposed by lowering the pH to a value of less than pH 9 and preferably to a value of between 4.0 and 8.5. This can be achieved by adding acid, for example sulphuric, hydrochloric or nitric acid. It may also be achieved by sparging with $CO_2$ or $SO_3$. The method of adding sulphuric acid (step 5) is preferred.

In this preferred method, the ettringite formed in step 3 is reacted with sulphuric acid at a pH of between 4 and 8.5. This results in the formation of a highly supersaturated solution of calcium sulphate, leaving only the amorphous aluminium trihydroxide in suspension. The amorphous aluminium trihydroxide is then separated by settling and/or filtration by a liquid solids separator 18 and may be washed and recycled back to step 3 of the process described above and illustrated in FIG. 1. The resulting supersaturated calcium sulphate solution is then sent to a high solids precipitator 20, similar to that used in step 2 of the process illustrated in FIG. 1. Here the calcium and sulphate levels are reduces by precipitation on gypsum seed, normally crystalline. The calcium sulphate in the saturated solution is at a saturation level of about 2.1 grams per liter. This produces a saturated calcium sulphate solution. The accumulated, precipitated gypsum is bled from the bottom of the solids/liquid separator 22 and removed from the system. The saturated calcium sulphate solution is recycled to the ettringite decomposition reactor.

The separation of amorphous aluminium trihydroxide from the calcium sulphate, both of which have resulted from the decomposition of the ettringite, in the ettringite slurry relies on the difference in calcium sulphate concentrations between supersaturated and saturated calcium sulphate solutions. The concentration of calcium sulphate in the solution is raised by the addition of sulphuric acid and/or recycled calcium sulphate solution. A sufficient volume of saturated calcium sulphate solution is added to the decomposed slurry to dissolve the calcium sulphate resulting from the decomposition of ettringite. This raises the concentration of calcium sulphate to above the saturation concentration. The level of supersaturation may be up to a total calcium sulphate concentration of about 8 grams per liter. It is important that this step is carried out at a pH of above 4 and generally less than 10 so that the amorphous aluminium trihydroxide remains insoluble. The solid aluminium trihydroxide which has remained in suspension is then removed from the supersaturated calcium sulphate solution by settling and/or filtration.

This process results in a high recovery of greater than 95% of amorphous aluminium trihydroxide, provided that sulphuric acid is used to decompose the ettringite.

The process of the invention will now be illustrated by means of the following examples.

EXAMPLE 1

5 liters of acid mine waste water, with a composition set out in Table 1 below, was treated with 4.5 grams of lime in a stirred reaction vessel. The lime addition was just enough to raise the pH of the waste water to 11.7. The reaction between lime and the free acidity in the water, as well as with the dissolved metal salts, results in the formation of calcium salts and the precipitation of magnesium, aluminium and the majority of heavy metal impurities present as hydroxides. This reaction was allowed to proceed for about 15 minutes and the precipitated solids were then separated. After this the waste water was analysed and the results are set out in column S1 in Table 1. The waste water was then returned to the reaction vessel and 500 grams of gypsum was added to the solution. The rate of the desupersaturation reaction is proportional to both the concentration difference between the ionic species in solution and the equilibrium saturation concentration and the surface area of seed material. The gypsum is added as the seed material to produce a large surface area of seed for precipitation to occur on. Stirring was again commenced for 20 minutes. The waste water was then separated from the gypsum and analysed. The results are set out in column S2 in Table 1.

The waste water was again returned to the reaction vessel and 5.0 grams of amorphous aluminium trihydroxide was added while stirring. Lime was then added again until the pH rose to and stabilised at 11.8. The reaction was allowed to proceed for 15 minutes and then the precipitated ettringite was separated from the waste water. The waste water was analysed again. The results are set out in column S3 in Table 1.

The waste waster was again returned to the reaction vessel and carbon dioxide was sparged into it until the pH dropped to a value of 8.5. The precipitated calcium carbonate was separated from the water. The waste water was again analysed. The results are set out in column S4 in Table 1.

TABLE 1

| Element | Raw Waste Water (mg/l) | S1 (mg/l) | S2 (mg/l) | S3 (mg/l) | S4 (mg/l) |
| --- | --- | --- | --- | --- | --- |
| Ca | 545 | 1209 | 580 | 146 | 6 |
| Mg | 345 | 1 | 1 | 0.05 | 0.05 |
| Mn | 23 | 0.02 | 0.02 | <0.01 | <0.02 |
| Fe | 10 | 0.04 | 0.03 | <0.02 | <0.02 |
| Al | 4 | 0.32 | 0.27 | 0.9 | 1.0 |
| K | 44 | 35 | 35 | 39 | 39 |
| Na | 41 | 46 | 46 | 55 | 55 |
| Cl | 10 | 10 | 11 | 26 | 26 |
| SO4 | 3000 | 2800 | 1450 | 73 | 75 |
| PH | 3.1 | 11.7 | 11.7 | 11.8 | 8.5 |
| T.D.S. | 4400 | 4270 | 2300 | 465 | 255 |

It will be noted that the calcium and sulphate content of the water has dropped markedly. The concentration of the other impurities, magnesium, manganese, iron and aluminium has also dropped markedly. This has resulted in the total dissolved solids content of the waste water also dropping markedly. The potassium, sodium and chloride content of the solution has remained substantially constant. The pH of the solution which previously was very low has now been brought to within a neutral range making it environmentally acceptable.

EXAMPLE 2

This example illustrates the recovery of amorphous aluminium trihydroxide from ettringite. The ettringite produced in Example 1 was filtered and washed and then added to 5 liters of saturated calcium sulphate solution in a stirred reaction vessel. Sulphuric acid was then slowly added until the pH dropped and stabilised at a value of 6.0. The slurry was then filtered to remove the solids. Both the solids and the resulting filtrate were analysed.

500 grams of calcium sulphate was then added to the filtrate in a stirred reaction vessel and the desupersaturation reaction allowed to proceed for 20 minutes. The slurry was then filtered and the calcium content of the filtrate measured again.

| | |
|---|---|
| Mass of solids recovered | 5.4 grams |
| Percentage Al in solids | 31.5% |
| Ca content of saturated solution | 595 mg/liter |
| Ca content of supersaturated solution | 1675 mg/liter |
| Ca content of desupersaturated solution | 607 mg/liter |
| Aluminium recovery | 98.3% |

As is apparent, almost total recovery of the amorphous aluminium trihydroxide was achieved. Almost all of the calcium in the ettringite was converted to calcium sulphate in the form of the supersaturated calcium sulphate solution. The supersaturated solution was easily desupersaturated to reform a saturated calcium sulphate solution. The saturated calcium sulphate solution can by recycled to the process for recovering amorphous aluminium trihydroxide from the ettringite while the recovered amorphous aluminium trihydroxide can be recycled to the process illustrated in FIG. 1.

What is claimed is:

1. A process for the removal of sulphates and calcium from a water stream, said process comprising the steps of:
   (a) adding an alkali to the water stream to raise the pH of the water stream to between 11 and 12.6;
   (b) combining the water stream with amorphous aluminum trihydroxide ($Al(OH)_3$) to cause formation of ettringite ($3CaO.Al_2O_3.3CaSO_4.31/32H_2O$) as a precipitate;
   (c) removing the precipitated ettringite from the water stream; and
   (d) decomposing the removed ettringite to recover amorphous aluminum trihydroxide, said decomposing comprising (a) treating the ettringite with a saturation calcium sulphate solution in an amount sufficient to form a suspension of amorphous aluminum trihydroxide in a supersaturated solution of calcium sulphate and (b) recovering the suspended amorphous aluminum trihydroxide while leaving the calcium sulphate remaining in the supersaturated solution.

2. A process according to claim 1, wherein the pH of the water stream is raised by combining it with an amount of lime (CaO).

3. A process according to claim 1, wherein the mass ratio of amorphous aluminum trihydroxide to sulphate present in the water stream is between 0.1 to 1:1.

4. A process according to claim 1, wherein the water stream contains calcium-associated sulphate and wherein the mass ratio of amorphous aluminum trihydroxide to sulphate present in the water stream is in the range of 0.5 to 0.8:1.

5. A process according claim 1, wherein the ettringite is removed from the water stream by solids/liquid separationn.

6. A process according to claim 5, wherein the solids/liquids separation is by settling and/or filtration.

7. A process according to claim 1, which comprises adding carbon dioxide to the water stream once the ettringite has been removed to cause precipitation of calcium carbonate or to cause the formation of soluble calcium bicarbonate.

8. A process according to claim 7, wherein the precipitated calcium carbonate is removed by solids/liquid separation.

9. A process according to claim 8, wherein the solids/liquid separation is by settling and/or filtration.

10. A process according to claim 1, wherein the water stream is mine water with a pH ranging from 2 to 8.

11. A process according to claim 10, wherein the water stream is mine water with an acidic pH.

12. A process according to claim 11, which comprises a first preliminary step of raising the pH of the water stream.

13. A process according to claim 12, wherein in the first preliminary step the water stream is combined with an amount of lime and/or another alkali to raise its pH.

14. A process according to claim 12, wherein the first preliminary step impurities that are insoluble at the raised pH are removed as precipitates.

15. A process according to claim 14, wherein the precipitates are hydroxides.

16. A process according to claim 14, wherein the precipitates are heavy metal precipitates.

17. A process according to claim 12, which comprises a second preliminary step of reducing the calcium sulphate content of the water stream to a saturation level by causing precipitation of calcium sulphate on gypsum in the form of calcium sulphate dihydrate.

18. A process according to claim 1, wherein the pH in the ettringite decomposition step is lowered to a pH in the range of 4.0 to 8.5 to decompose the ettringite.

19. A process according to claim 18, wherein the pH in the ettringite decomposition step is lowered by adding an acid or by sparging with $CO_2$ or $SO_3$ gas.

20. A process according to claim 19, wherein the pH in the ettringite decomposition step is lowered by adding sulphuric acid.

21. A process according to claim 1, which comprises the step of desupersaturating the supersaturated calcium sulphate solution by precipitating calcium sulphate on gypsum seed to form gypsum and a saturated calcium sulphate solution.

22. A process according to claim 21, comprising recycling the saturated calcium sulfate solution and using the recycled saturated calcium sulfate solution in step (d) to decompose the removed ettringite.

* * * * *